July 23, 1946.  P. R. WHEELER  2,404,420
BEARING ASSEMBLY
Filed Jan. 5, 1944
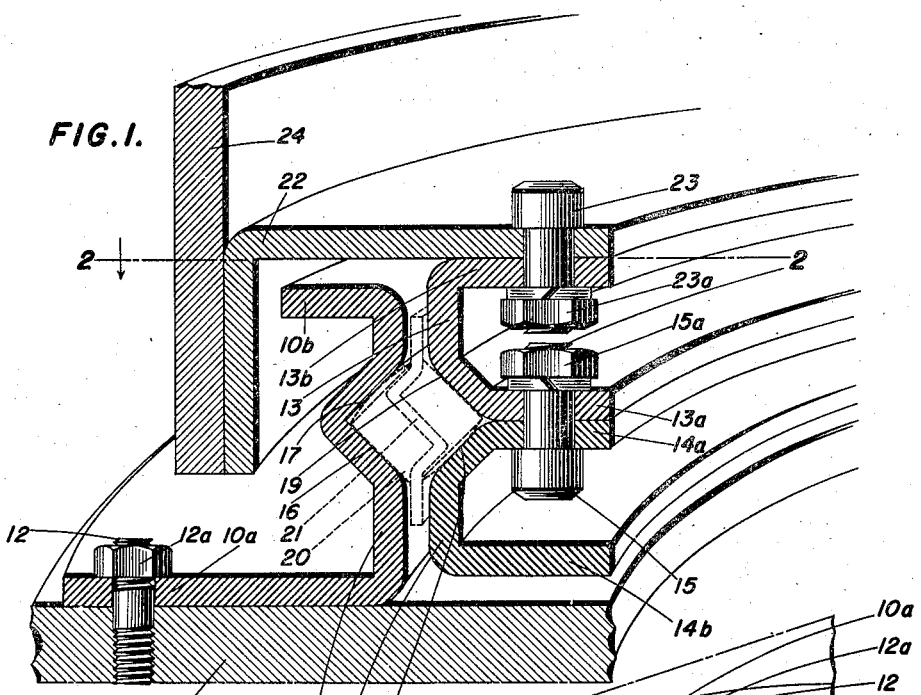
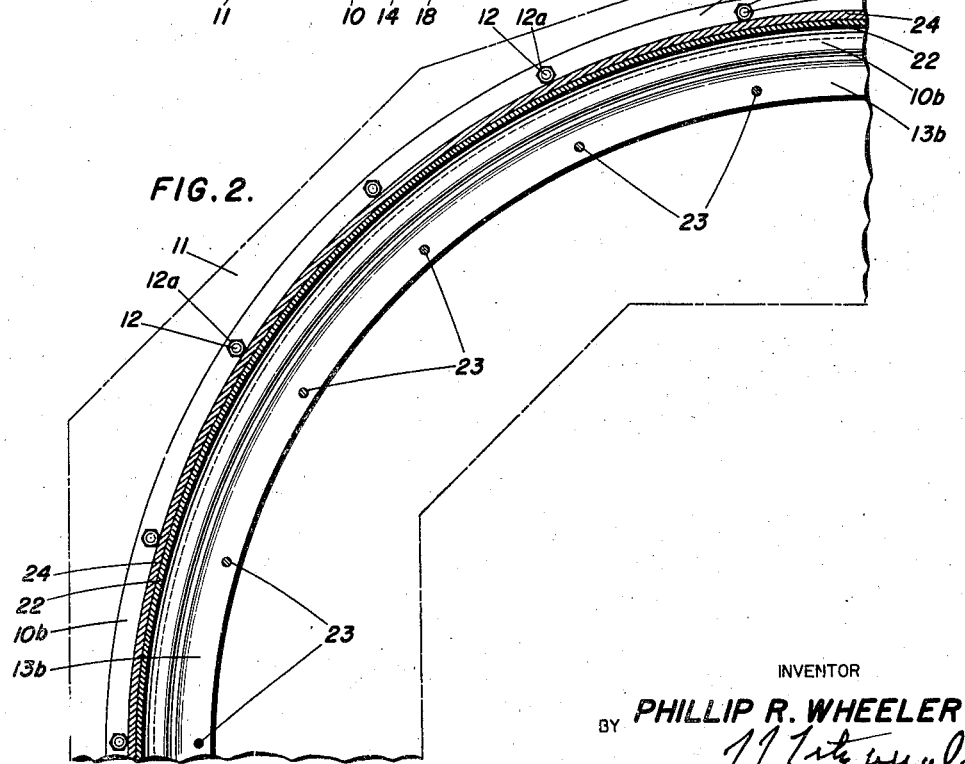
INVENTOR
PHILLIP R. WHEELER
ATTORNEY Patented July 23, 1946

2,404,420

UNITED STATES PATENT OFFICE 2,404,420

BEARING ASSEMBLY

Phillip R. Wheeler, Alexandria, Va.

Application January 5, 1944, Serial No. 517,050

2 Claims. (Cl. 308—235)

(Granted under the act of March 3, 1883, as amended April 30, 1928; 370 O. G. 757)

This invention relates to bearing assemblies and has particular relation to a raceway structure for use in bearing assemblies.

An object of the invention is to provide an improved sheet metal raceway structure for use in bearing assemblies.

Another object of the invention is to provide an improved sheet metal raceway structure for use in bearing assemblies supporting radial loads in opposite directions and thrust loads in opposite directions.

A further object of the invention is to provide an improved sheet metal raceway structure of economical manufacture which is of sturdy, rigid construction and which is extremely light in weight with relation to the heavy load which it is capable of supporting.

A still further object of the invention is to provide a bearing assembly which is particularly adapted to be protected from damage caused by foreign objects, rain and water, and which is constructed to permit rapid and continuous drainage of the race.

These and other objects of the invention will be understood from the following description with reference to the accompanying drawing, in which:

Fig. 1 is a sectional perspective view of a bearing assembly having one form of the new raceway, and Fig. 2 is a horizontal sectional view on the line 2—2 of Fig. 1.

The invention is illustrated in preferred form suitable for use in a ring mount for a machine gun installation. The outer race ring comprises a strip of sheet metal which is generally 3-shaped in cross-section with its vertical portion bent to form a longitudinally extending, substantially V-shaped race-forming channel. The bottom flange 10a is secured to a base 11 by a stud bolt 12 and nut 12a. The inner race ring is formed of sheet metal and comprises a U-shaped upper section 13 and a U-shaped lower section 14, joined at their inner adjacent flanges 13a and 14a by a bolt 15 and nut 15a. In the form as shown, the sections 13 and 14 are identical in shape and are fashioned in the same die, thereby contributing to the economical manufacture of the bearing assembly. The inner adjacent corners of the sections 13 and 14 are bent to provide a substantially V-shaped race-forming channel which is complementary to the channel in the V-shaped portion of the element 10. Thus, a channel or raceway is provided which is defined by surfaces 16 and 17 of the V-shaped portion of the element 10 and by the flattened corners 19 and 18 of the sections 13 and 14. The opposing sides 16 and 19 are positioned parallel to each other and perpendicular to the opposing sides 17 and 18, which are likewise positioned parallel to each other, thereby forming a raceway of rectangular cross-section. The sides 16, 17, 18 and 19, as shown, are of approximately equal width, so that the raceway is substantially square-shaped in cross-section.

Anti-friction rollers, one of which is shown at 20, are disposed in the raceway with their axes parallel to the sides 16 and 19, the rolls being retained in position by a roller separator 21 which is described in a copending application of E. H. Irasek, Serial No. 510,908, filed November 19, 1943, now Patent 2,349,824, issued May 30, 1944. The roller 20 is adapted to support the down thrust when a load is applied to the section 13. A plurality of rollers, not shown, are disposed in the raceway with their axes parallel to the sides 17 and 18 for taking up the thrust when a load is applied to the section 14. Thus, a bearing assembly is provided which is capable of supporting radial loads in both directions and thrust loads in both directions.

A shielding apron 22, in the form of an L-shaped strip of sheet metal, is secured to the upper flange 13b of the section 13 by a bolt 23 and nut 23a and is welded to an additional protective and supporting shield 24 disposed outwardly of and surrounding the bearing assembly. In the structure as shown, the radial and thrust loads are applied to the sections 13 and 14 through the shield 24 and the apron 22. However, it will be understood that the loads may be applied at any desired point of the bearing assembly.

The invention has particular use in a ring mount for machine gun installations, where sturdiness and light weight are of prime importance, and in which the ring mounts must be constructed to withstand exposure to ordnance missiles, rain and water spray. In this connection, it is desired to point out that the new bearing assembly is particularly adapted to this purpose. The apron 22 and the shield 24 protect the bearing assembly from being struck by foreign objects, such as ordnance missiles. The apron 22 further serves to protect the bearing assembly from exposure to rain and, when installed aboard ship, from exposure to wash water and water spray. The bearing assembly is so constructed that water can enter the raceway from the outer ring only by being forced laterally through the space between the base plate flange 10a and the shield 24, then upwardly between the outer race ring 10 and the vertical flange of apron 22, then passing inwardly and laterally between the outwardly extending flange 10b and the apron 22. Water can enter the raceway from the inner ring only by being forced laterally and outwardly through the space between the base 11 and the lower flange 14b of the inner race ring 14 and then passing upwardly between the outer race ring 10 and the inner race ring 14. In this connection, the novel structure of the bearing assembly permits rapid and continuous drainage, since the water washed into the raceway is immediately drained therefrom by passing through the space between the lower portion of the outer race ring 10 and the lower inner race ring 14.

While the invention has been described for use in a circular bearing supporting anti-friction rollers for taking radial loads in both directions and thrust loads in both directions, it will be understood that use of the invention is not limited to this application and that it may be used to advantage in other bearing assemblies, such as those types having a straight race track or those employing anti-friction ball rolls.

While the bearing races of the present invention have been described as formed from rolled sheet metal which may be either steel or any suitable nonferrous material such as aluminum, magnesium or copper base alloys, it will be apparent that the races may be formed by extrusion and the term sheet metal is intended to include extruded sections which may be of variable thickness. The extrusion process is advantageous when using light alloys which must be refrigerated after being subjected to certain types of forming such as rolling. The extrusion method has the further advantage of providing greater flexibility in the shape and location of that part of the raceway which attaches to either the fixed or the rotating structure, such as is present in a gun turret. This is desirable where a replacement bearing must be adapted to fit into an existing space and be assembled with an existing structure. It has been found that the above described extruded sections are adaptable for use where a maximum load-carrying capacity and a minimum of weight are desired of the present bearing assembly, such as in aircraft gun turrets.

The invention herein described may be manufactured and used by or for the Government of the United States of America for governmental purposes without the payment of any royalties thereon or therefor.

I claim:

1. A bearing assembly comprising a self-contained raceway structure having a plurality of channel members of substantially uniform thickness, one of said members of 3-shaped cross-section having a V-shaped race and adjacent strengthening flanges, and at least one of said members of E-shaped cross-section comprising at least two separable and interchangeable elements of substantially U-shaped cross-section forming a complementary V-shaped race with adjacent strengthening flanges, said elements being coupled adjacent the vertex of this V-shaped race, releasable coupling means for said elements to permit easy disassembly thereof, said channel members being positioned with the V-shaped races aligned in opposed relation to form a raceway of substantially rectangular cross-section, and anti-friction means disposed in said rectangular raceway whereby the bearing assembly will freely support loads in any direction.

2. A bearing assembly comprising a self-contained raceway structure having a plurality of channel members of substantially uniform thickness, one of said members of 3-shaped cross-section having a V-shaped race and adjacent strengthening flanges, and at least one of said members of E-shaped cross-section comprising at least two separable and interchangeable elements of substantially U-shaped cross-section forming a complementary V-shaped race with adjacent strengthening flanges, said elements being coupled at the vertex of this V-shaped race, releasable coupling means for said element to permit easy disassembly thereof, said channel members being positioned with the V-shaped races aligned in opposed relation to form a raceway of substantially rectangular cross-section, anti-friction means disposed in said rectangular raceway, and a shielding apron attached to one of said channel members, and extending over and alongside of the other channel member.

PHILLIP R. WHEELER.